US012784654B2

(12) United States Patent
Jin

(10) Patent No.: US 12,784,654 B2
(45) Date of Patent: Nov. 3, 2026

(54) DISPLAY DEVICE AND METHOD OF DRIVING THE SAME

(71) Applicant: Samsung Display Co., LTD., Yongin-si (KR)

(72) Inventor: In-Won Jin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 18 days.

(21) Appl. No.: 18/830,367

(22) Filed: Sep. 10, 2024

(65) Prior Publication Data

US 2025/0104611 A1 Mar. 27, 2025

(30) Foreign Application Priority Data

Sep. 25, 2023 (KR) ........................ 10-2023-0127904

(51) Int. Cl.
*G09G 3/32* (2016.01)
*G09G 3/3291* (2016.01)

(52) U.S. Cl.
CPC ............. *G09G 3/32* (2013.01); *G09G 3/3291* (2013.01); *G09G 2310/0275* (2013.01); *G09G 2320/0247* (2013.01); *G09G 2320/0271* (2013.01)

(58) Field of Classification Search
CPC ... G09G 2320/0247; G09G 2320/0233; G09G 2320/0252; G09G 2320/0626; G09G 2320/0271; G09G 2320/0276; G09G 2320/0261; G09G 2320/0673; G09G 2340/0435; G09G 2330/021; G09G 3/3233; G09G 3/32; G09G 3/3648; G09G 3/20; G09G 3/36; G09G 3/2022; G09G 3/3266; G09G 3/2007; G09G 3/2014; G09G 3/3607; G09G 3/3611; G09G 3/3406; G09G 3/3208; G09G 2310/08; G09G 2310/027; G09G 2310/061; G09G 2300/0842; G09G 2300/0861; G09G 2300/0819; G09G 2300/0426
See application file for complete search history.

(56) References Cited

U.S. PATENT DOCUMENTS

| | | | | |
|---|---|---|---|---|
| 2008/0198118 A1* | 8/2008 | Choi | .................... | G09G 3/3696 345/89 |
| 2018/0122327 A1* | 5/2018 | Kim | ..................... | G09G 3/3688 |
| 2019/0180695 A1* | 6/2019 | Ha | ....................... | G09G 3/2051 |
| 2021/0150965 A1* | 5/2021 | Zhang | .................. | G09G 3/3208 |
| 2024/0021134 A1* | 1/2024 | He | ....................... | G09G 3/3637 |

FOREIGN PATENT DOCUMENTS

| | | | |
|---|---|---|---|
| KR | 1020220041509 | A | 4/2022 |
| KR | 1020230069275 | A | 5/2023 |
| KR | 20240043882 | A | 4/2024 |

* cited by examiner

*Primary Examiner* — Dong Hui Liang
(74) *Attorney, Agent, or Firm* — CANTOR COLBURN LLP

(57) ABSTRACT

A display device includes: a display panel including pixels; a driving controller which receives input image data including an input grayscale from a host and generate a data signal including an output grayscale based on the input image data; and a data driver which converts the data signal into a data voltage to provide the data voltage to the display panel. When a driving frequency of the display panel is changed from a relatively high frequency to a relatively low frequency, an output grayscale of a first low frequency frame having the relatively low frequency is less than or equal to the input grayscale.

16 Claims, 11 Drawing Sheets

DISPLAY DEVICE AND METHOD OF DRIVING THE SAME

This application claims priority to Korean Patent Application No. 10-2023-0127904, filed on Sep. 25, 2023, and all the benefits accruing therefrom under 35 U.S.C. § 119, the content of which in its entirety is herein incorporated by reference.

BACKGROUND

1. Field

Embodiments of the inventive concept relate to a display device and a method of driving the same. More particularly, embodiments of the inventive concept relate to a display device and a method of driving the same for improving a display quality in a variable frequency.

2. Description of the Related Art

Generally, a display device may include a display panel and a display panel driver. The display panel may include gate lines, data lines, emission lines and pixels. The display panel driver may include a gate driver for providing gate signal respectively to the gate lines, a data driver for providing a data voltage to the data lines, an emission driver for providing emission signals respectively to the emission lines and a driving controller for controlling the gate driver, the data driver and the emission driver.

When a driving frequency of the display panel changes from a relatively high frequency to a relatively low frequency, a hysteresis characteristics of a driving transistor of the pixel may change, and a luminance difference of the display panel may occur. The luminance difference of the display panel may be visible to a user as a flicker.

SUMMARY

Embodiments of the inventive concept provide a display device which decreases a luminance difference when a driving frequency of a display panel changes from a relatively high frequency to a relatively low frequency.

Embodiments of the inventive concept provide a method of driving using the display device.

In an embodiment of a display device according to the inventive concept, the display device comprises a display panel including pixels, a driving controller which receives input image data including an input grayscale from a host and generate a data signal including an output grayscale based on the input image data, and a data driver which converts the data signal into a data voltage and provides the data voltage to the display panel. In a case which a driving frequency of the display panel is changed from a relatively high frequency to a relatively low frequency, an output grayscale of a first low frequency frame having the relatively low frequency is less than or equal to the input grayscale.

In an embodiment, the output grayscale of the first low frequency frame may be less than or equal to an output grayscale of a high frequency frame having the relatively high frequency.

In an embodiment, in a case which a frequency interval, which is a difference between the relatively high frequency and the relatively low frequency, is greater than or equal to a reference frequency interval, the output grayscale of the first low frequency frame may be less than the input grayscale.

In an embodiment, in a case which the frequency interval is less than the reference frequency interval, the output grayscale of the first low frequency frame may be equal to the input grayscale.

In an embodiment, the reference frequency interval may be changed in a case which the input grayscale value is changed.

In an embodiment, the reference frequency interval may be decreased in a case which the input grayscale is decreased.

In an embodiment, an average luminance of the first low frequency frame may be greater in a case which a frequency interval, which is a difference between the relatively high frequency and the relatively low frequency, may be greater.

In an embodiment, a compensation grayscale of the first low frequency frame, which is a difference between the input grayscale and the output grayscale of the first low frequency frame, may be greater in a case which a difference between the average luminance of the first low frequency frame and a target luminance corresponding to the input grayscale is greater.

In an embodiment, an output grayscale of a second low frequency frame having the relatively low frequency may be greater than or equal to the output grayscale of the first low frequency frame and may be less than or equal to the input grayscale.

In an embodiment, the output grayscale may be gradually increased toward the input grayscale in the first low frequency frame and the second low frequency frame.

In an embodiment of a method of driving a display device according to the inventive concept, the method comprises receiving input image data including an input grayscale from a host and generating a data signal including an output grayscale based on the input image data, and converting the data signal into a data voltage and providing the data voltage to a display panel. In a case which a driving frequency of the display panel is changed from a relatively high frequency to a relatively low frequency, an output grayscale of a first low frequency frame having the relatively low frequency is less than or equal to the input grayscale.

In an embodiment, the output grayscale of the first low frequency frame may be less than or equal to an output grayscale of a high frequency frame having the relatively high frequency.

In an embodiment, the output grayscale of the first low frequency frame may be less than the input grayscale in a case which a frequency interval, which is a difference between the relatively high frequency and the relatively low frequency, is greater than or equal to a reference frequency interval.

In an embodiment, the output grayscale of the first low frequency frame may be equal to the input grayscale in a case which the frequency interval is less than the reference frequency interval.

In an embodiment, the reference frequency interval may be changed in a case which the input grayscale is changed.

In an embodiment, the reference frequency interval may be decreased in a case which the input grayscale is decreased.

In an embodiment, an average luminance of the first low frequency frame may be greater in a case which a frequency interval, which is a difference between the relatively high frequency and the relatively low frequency, is greater.

In an embodiment, a compensation grayscale of the first low frequency frame, which is a difference between the input grayscale and the output grayscale of the first low frequency frame, may be greater in a case which a difference between the average luminance of the first low frequency frame and a target luminance corresponding to the input grayscale is greater.

In an embodiment, an output grayscale of a second low frequency frame having the relatively low frequency may be greater than or equal to the output grayscale of the first low frequency frame and may be less than or equal to the input grayscale.

In an embodiment, the output grayscale may be gradually increased toward the input grayscale in the first low frequency frame and the second low frequency frame.

According to the display device and the method of driving the display device, in a case which the driving frequency of the display panel is changed from the relatively high frequency to the relatively low frequency, the output grayscale of the first low frequency frame having the relatively low frequency may be less than or equal to the input grayscale. Accordingly, a luminance difference when the driving frequency of the display panel changes from the relatively high frequency to the relatively low frequency may be reduced.

BRIEF DESCRIPTION OF THE DRAWINGS

The above and other features of embodiments of the inventive concept will become more apparent by describing in detailed embodiments thereof with reference to the accompanying drawings, in which.

DETAILED DESCRIPTION

Figure 1:
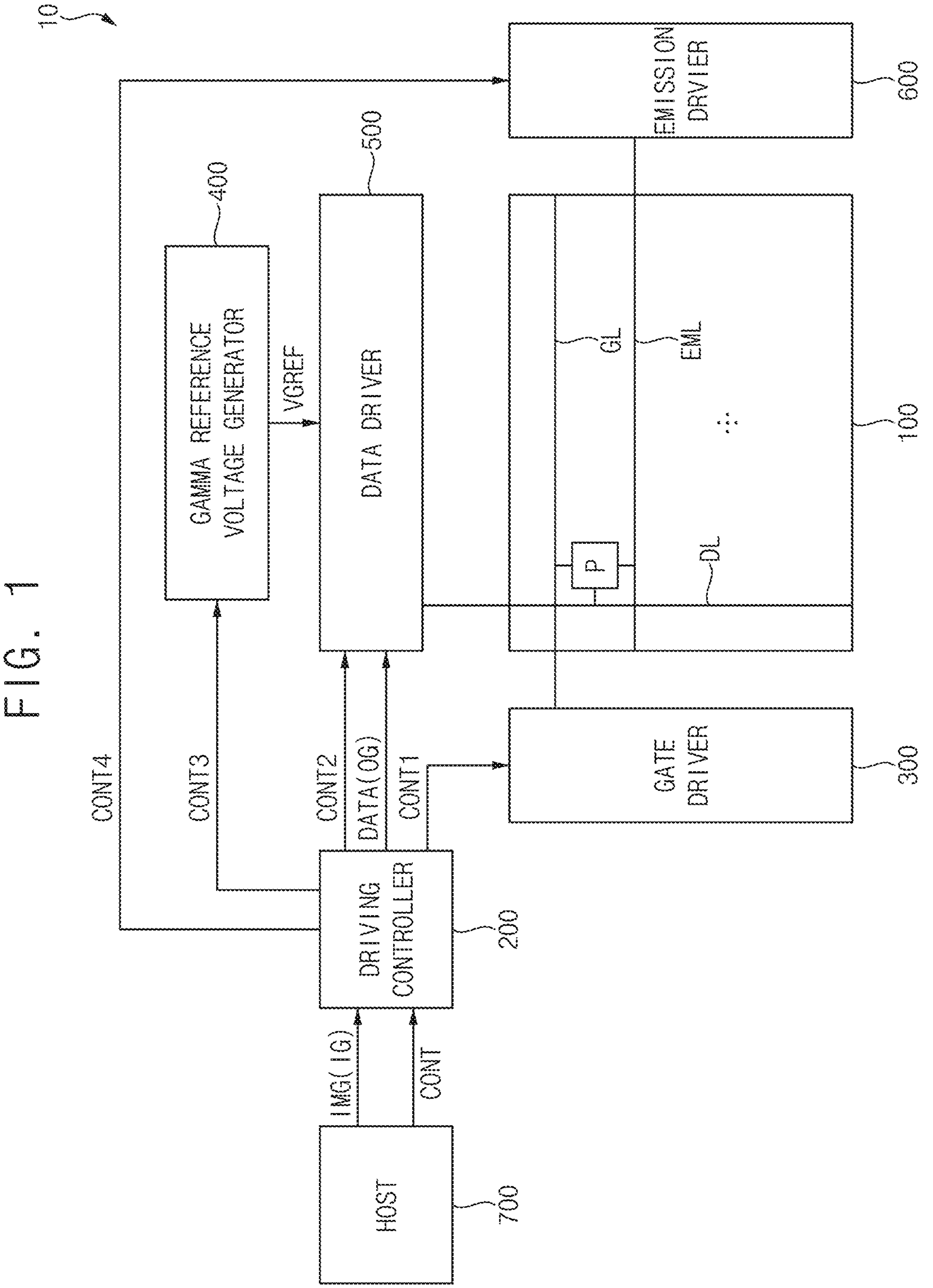
FIG. 1 is a block diagram illustrating an embodiment of a display device according to the inventive concept.

Hereinafter, the disclosure will be described in more detail with reference to the accompanying drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram illustrating an embodiment of a display device 10 according to the inventive concept.

Referring to FIG. 1, a display device 10 may include a display panel 100 and a display panel driver. The display panel driver may include a driving controller 200, a gate driver 300, a gamma reference voltage generator 400, a data driver 500, and an emission driver 600. The display device 10 may further include a host 700.

In an embodiment, the driving controller 200 and the data driver 500 may be unitary, for example. In an embodiment, the driving controller 200, the gamma reference voltage generator 400 and the data driver 500 may be unitary, for example. In an embodiment, the driving controller 200, the gate driver 300, the gamma reference voltage generator 400 and the data driver 500 may be unitary, for example. In an embodiment, the driving controller 200, the gate driver 300, the gamma reference voltage generator 400, the data driver 500 and the emission driver 600 may be unitary, for example. A driving module in which at least the driving controller 200 and the data driver 500 are unitary may be also referred to as a timing controller embedded data driver ("TED").

The display panel 100 may include a display area for displaying an image and a peripheral area disposed adjacent to the display area.

In the illustrated embodiment, the display panel 100 may be an organic light-emitting diode display panel including an organic light-emitting diode, for example. In an embodiment, the display panel 100 may be a quantum-dot organic light-emitting diode display panel including an organic light-emitting diode and a quantum-dot color filter, for example. In an embodiment, the display panel 100 may be a quantum-dot nano light-emitting diode display panel including a nano light-emitting diode and a quantum-dot color filter, for example.

The display panel 100 may include gate lines GL, data lines DL, emission lines EML and pixels P electrically connected to the gate lines GL and the data lines DL and the emission lines EML, respectively. The gate lines GL may extend in a first direction (e.g., horizontal direction in FIG. 1), the data lines DL may extend in a second direction (e.g., vertical direction in FIG. 1) crossing the first direction and the emission lines EML may extend in the first direction.

The driving controller 200 may receive input image data IMG and an input control signal CONT from the host 700. The input image data IMG may include an information for a grayscale, and the grayscale of the input image data IMG may be referred to as input grayscale IG. In an embodiment, the input image data IMG may include red image data, green image data and blue image data, for example. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4 and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate a data signal DATA based on the input image data IMG. The data signal DATA may include an information for the grayscale, and the grayscale of the data signal DATA may be referred to as an output grayscale OG. The output grayscale OG may be calculated through a grayscale compensation operation for the input grayscale IG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated on the peripheral area of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or may be disposed in the data driver 500, for example.

The data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

The emission driver 600 may generate emission signals for driving the emission lines EML in response to the fourth control signal CONT4 received from the driving controller 200. The emission driver 600 may output the emission signals to the emission lines EML.

In an embodiment, the emission driver 600 may be integrated into the peripheral area of the display panel 100. In an embodiment, the emission driver 600 may be disposed (e.g., mounted) on the peripheral area of the display panel 100.

In FIG. 1, for a convenience of an explanation, the gate driver 300 may be disposed on a first side (e.g., left side in FIG. 1) of the display panel 100 and the emission driver 600 may be disposed on a second side (e.g., right side in FIG. 1) of the display panel 100. However, the inventive concept is not limited thereto. In an embodiment, both the gate driver 300 and the emission driver 600 may be disposed on the first side of the display panel 100, for example. In an embodiment, both the gate driver 300 and the emission driver 600 may be disposed on both of opposite sides of the display panel 100, for example. In an embodiment, the gate driver 300 and the emission driver 600 may be unitary with each other, for example.

Figure 2:
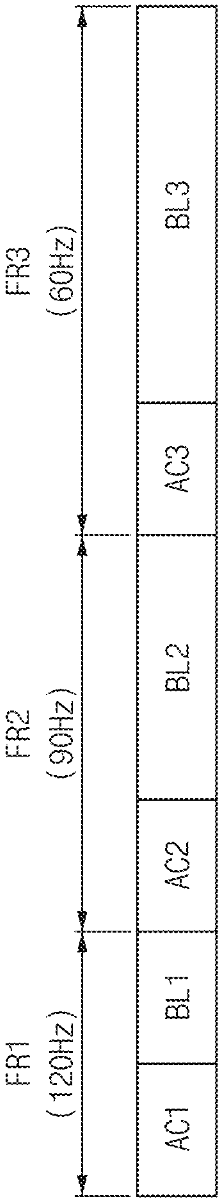
FIG. 2 is a schematic diagram illustrating a driving frequency of a display panel of FIG. 1.

FIG. 2 is a schematic diagram illustrating a driving frequency of a display panel 100 of FIG. 1.

Referring to FIG. 2, the display panel 100 may be driven at a variable frequency. A first frame FR1 having a first driving frequency may include a first active period AC1 and a first blank period BL1. A second frame FR2 having a second driving frequency different from the first driving frequency may include a second active period AC2 and a second blank period BL2. A third frame FR3 having a third driving frequency different from the first driving frequency and the second driving frequency may include a third active period AC3 and a third blank period BL3.

In an embodiment, as shown in FIG. 2, the first frame FR1 may have a driving frequency of 120 hertz (Hz), the second frame FR2 may have a driving frequency of 90 Hz, and the third frame period FR3 may have a driving frequency of 60 Hz, for example.

The first active period AC1 may have the same length as that of the second active period AC2, and the first blank period BL1 may have a length different from that of the second blank period BL2. In other words, a frame cycle of the second driving frequency may be different from a frame cycle of the first driving frequency.

The second active period AC2 may have the same length as that of the third active period AC3, and the second blank period BL2 may have a length different from that of the third blank period BL3. In other words, a frame cycle of the third driving frequency may be different from the frame cycle of the second driving frequency.

Figure 3:
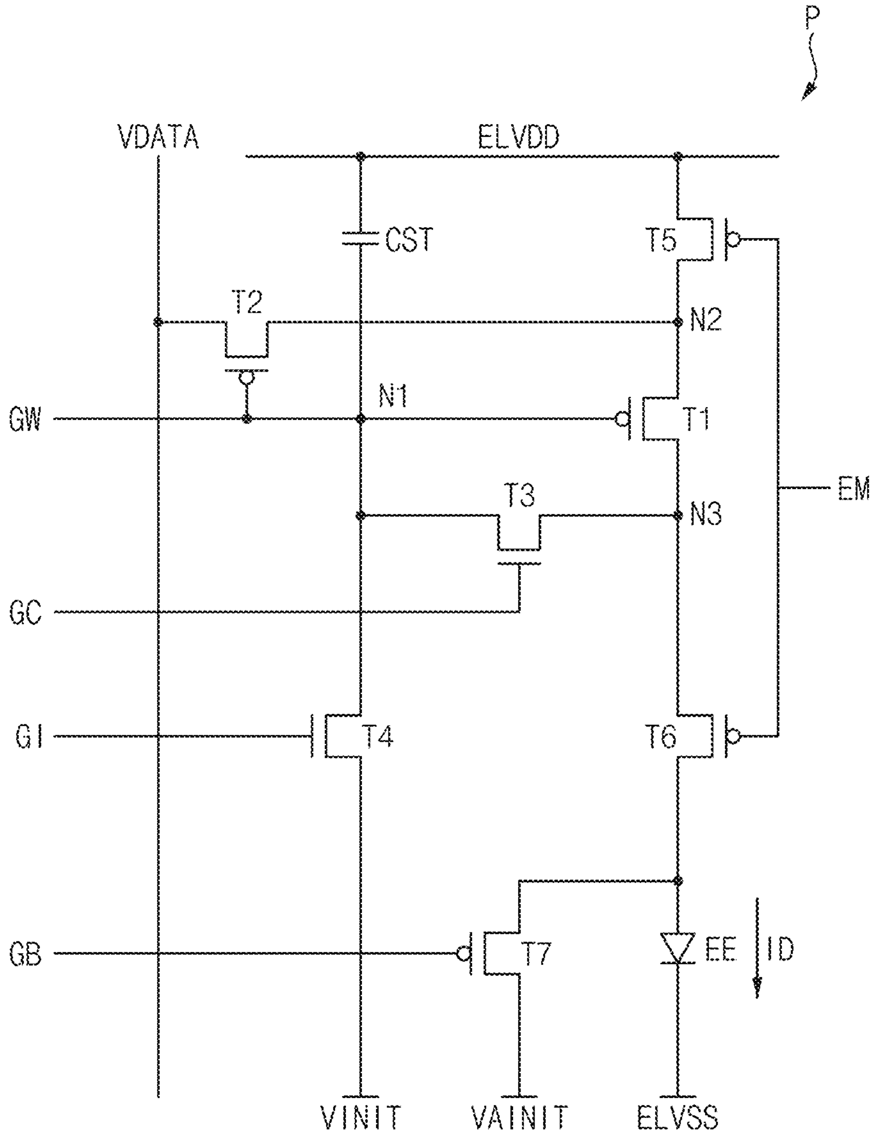
FIG. 3 is a circuit diagram illustrating an embodiment of a pixel P included in a display device of FIG. 1.
Figure 4:
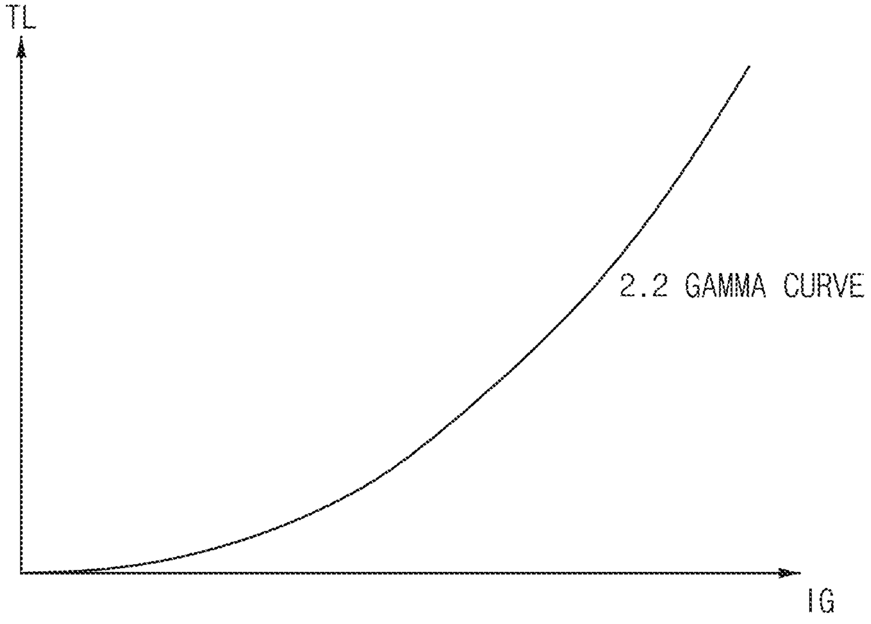
FIG. 4 is a graph illustrating a target luminance according to an input grayscale IG.

FIG. 3 is a circuit diagram illustrating an embodiment of a pixel P included in a display device 10 of FIG. 1. FIG. 4 is a graph illustrating a target luminance TL according to an input grayscale IG.

Referring to FIG. 3, the pixel P may include first to seventh transistors T1 to T7 and a light-emitting element EE.

The first transistor T1 (that is, a driving transistor) may include a gate electrode connected to a first node N1, a first electrode connected to a second node N2, and a second electrode connected to a third node N3.

The second transistor T2 may include a gate electrode to which a data write gate signal GW is applied, a first electrode to which a data voltage VDATA is applied, and a second electrode connected to the second node N2. The data voltage VDATA may be applied to the pixel P according to the data write gate signal GW.

The third transistor T3 may include a gate electrode to which a compensation gate signal GC is applied, a first electrode connected to the first node N1, and a second electrode connected to the third node N3. A threshold voltage of the first transistor T1 may be compensated according to the compensation gate signal GC.

The fourth transistor T4 may include a gate electrode to which a data initialization gate signal GI is applied, a first electrode to which an initialization voltage VINIT is applied, and a second electrode connected to the first node N1. According to the data initialization gate signal GI, the gate electrode of the first transistor T1 may be initialized to the initialization voltage VINIT.

The fifth transistor T5 may include a gate electrode to which an emission signal EM is applied, a first electrode to which a first driving voltage ELVDD is applied, and a second electrode connected to the second node N2.

The sixth transistor T6 may include a gate electrode to which the emission signal EM is applied, a first electrode connected to the third node N3, and a second electrode connected to an anode electrode of the light-emitting element EE.

The seventh transistor T7 may include a gate electrode to which a light-emitting element initialization gate signal GB is applied, a first electrode to which a light-emitting element initialization voltage VAINIT is applied and a second electrode connected to the anode electrode of the light-emitting element EE. The anode electrode of the light-emitting element EE may be initialized to the light-emitting element initialization voltage VAINIT according to the light-emitting element initialization gate signal GB.

The light-emitting element EE may include the anode electrode and a cathode electrode to which a second driving voltage ELVSS is applied. The second driving voltage ELVSS may be lower than the first driving voltage ELVDD.

The pixel P may further include a storage capacitor CST including a first electrode to which the first driving voltage ELVDD is applied and a second electrode connected to the first node N1. The storage capacitor CST may store a voltage corresponding to the data voltage VDATA.

A driving current ID of the pixel P may sequentially flow to the fifth transistor T5, the first transistor T1 and the sixth transistor T6 to drive the light-emitting element EE. A luminance of the light-emitting element EE may be determined by intensity of the driving current ID. The intensity of the driving current ID may be determined by a level of the data voltage VDATA. The level of the data voltage VDATA may be determined by an input grayscale IG and an output grayscale OG. As shown in a 2.2 gamma curve of FIG. 4, a target luminance TL may be increased as the input grayscale IG is increased. The target luminance TL corresponding to the input grayscale IG may be the same for different driving frequencies.

When all of the transistors included in the pixel P are P-type transistors, flicker may occur due to leakage currents of the transistors in low-frequency driving. Accordingly, some of the transistors included in the pixel P may be N-type transistors. In the illustrated embodiment, the third transistor T3 and the fourth transistor T4 may be the N-type transistors, and the first transistor T1, the second transistor T2, the fifth transistor T5, the sixth transistor T6 and the seventh transistor T7 may be the P-type transistors. However, the disclosure is not limited thereto. The disclosure may be applied to a pixel including only the P-type transistor or may be applied to a pixel including only the N-type transistor.

Figure 5:
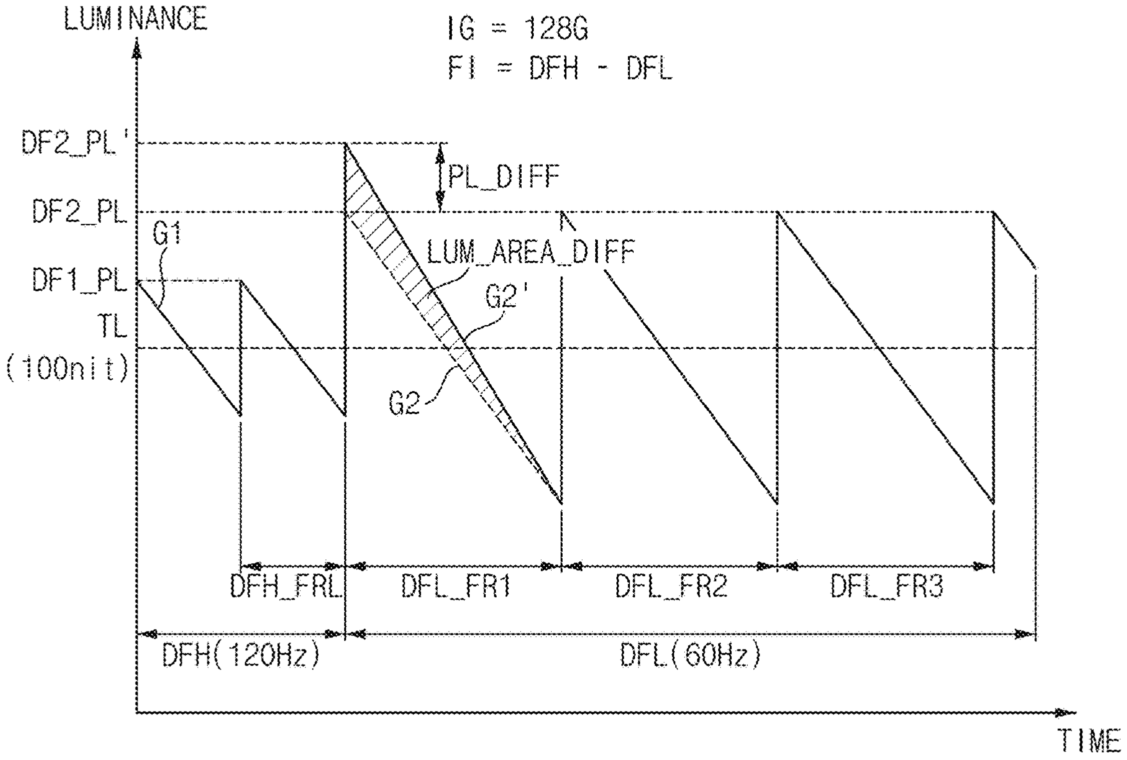
FIG. 5 is a diagram illustrating an embodiment of a luminance of the display panel when a grayscale compensation operation is not performed.
Figure 6:
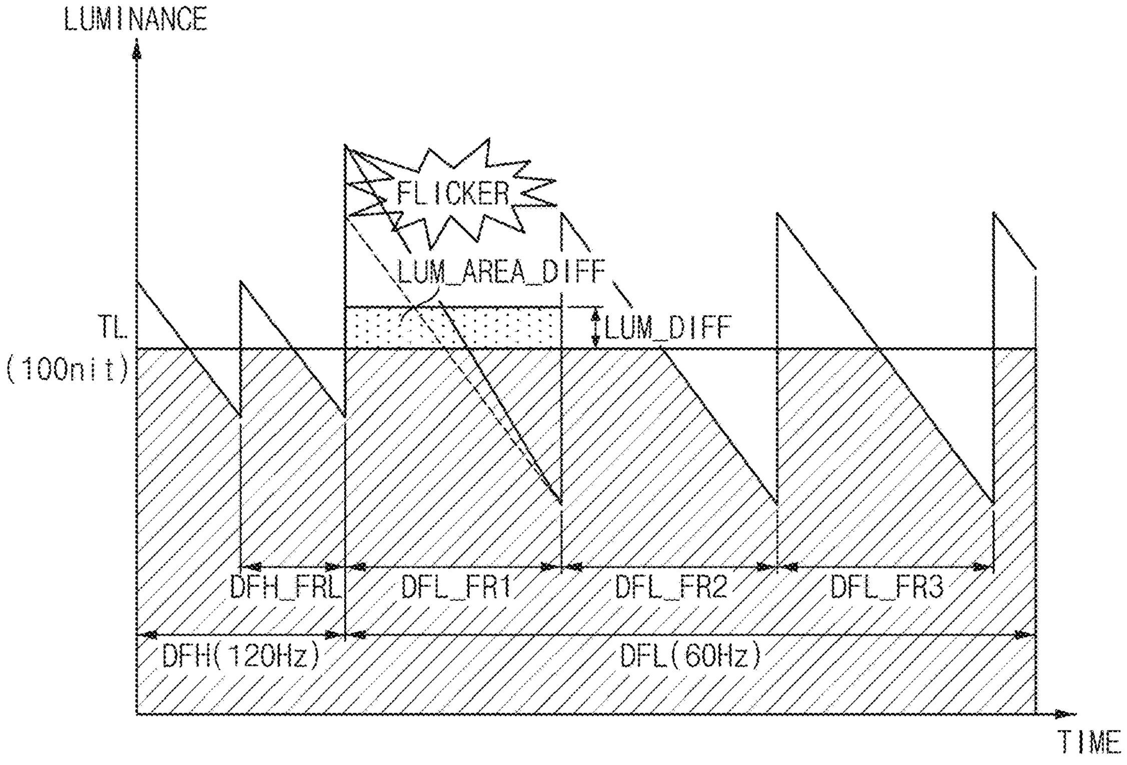
FIG. 6 is a diagram illustrating the luminance of the display panel of FIG. 5 visually recognized by a user.

FIG. 5 is a diagram illustrating an embodiment of a luminance of the display panel 100 when a grayscale compensation operation is not performed. FIG. 6 is a diagram illustrating the luminance of the display panel 100 of FIG. 5 visually recognized by a user.

Referring to FIGS. 5 and 6, the driving frequency of the display panel 100 may be changed from a high frequency DFH to a low frequency DFL lower than the high frequency DFH. In an embodiment, the high frequency DFH may be 120 Hz and the low frequency DFL may be 60 Hz, in which a frequency interval FI, which is a difference between the high frequency DFH and the low frequency DFL, may be 60 Hz, for example. In an embodiment, the input grayscale IG may be 128 grayscales, and a target luminance TL corresponding to the input grayscale IG may be 100 nit, for example. The target luminance TL according to the input grayscales IG at the high frequency DFH and the low frequency DFL may be the same. Since the low frequency DFL is lower than the high frequency DFH, a frame cycle of the low frequency DFL may be longer than a frame cycle of the high frequency DFH.

When the driving frequency of the display panel 100 is changed from the high frequency DFH to the low frequency DFL, a hysteresis characteristic of the driving transistor T1 may be changed. The hysteresis characteristic of the driving transistor T1 may refer to a driving current ID according to a gate-source voltage of the driving transistor T1. Thus, when the hysteresis characteristic of the driving transistor T1 is changed, the display panel 100 according to the same input grayscale IG may have a different luminance. The luminance difference of the display panel 100 may be visually recognized as a flicker to a user.

Specifically, since the hysteresis characteristic of the driving transistor T1 is not changed in the last high frequency frame DFH_FRL having the high frequency DFH, an optical waveform of the last high frequency frame DFH_FRL may be an optical waveform G1 in which a flicker of the high frequency DFH is not visually recognized. A peak luminance of the last high frequency frame DFH_FRL may be a peak luminance DF1_PL of the optical waveform G1 in which the flicker of the high frequency DFH is not visually recognized. When the area of the optical waveform of the last high frequency frame DFH_FRL is divided by the frame cycle of the high frequency DFH, an average luminance of the last high frequency frame DFH_FRL may be calculated, as shown in FIG. 6. Since the optical waveform of the last high frequency frame DFH_FRL is the optical waveform G1 in which the flicker of the high frequency DFH is not visually recognized, the average luminance of the last high frequency frame DFH_FRL may be the target luminance TL. The average luminance of the last high frequency frame DFH_FRL may be visually recognized as the luminance of the display panel 100 to the user.

Since the hysteresis characteristic of the driving transistor T1 is changed in a first low frequency frame DFL_FR1 having the low frequency DFL, an optical waveform of the first low frequency frame DFL_FR1 may be an optical waveform G2' in which the flicker of the low frequency DFL is visually recognized. A peak luminance of the first low frequency frame DFL_FR1 may be a peak luminance DF2_PL' of the optical waveform G2' in which the flicker of the low frequency DFL is visually recognized. When the area of the optical waveform of the first low frequency frame DFL_FR1 is divided by the frame cycle of the low frequency DFL, an average luminance of the first low frequency frame DFL_FR1 may be calculated, as shown in FIG. 6. Since the optical waveform of the first low frequency frame DFL_FR1 is the optical waveform G2' in which the flicker of the low frequency DFL is visually recognized, the average luminance of the first low frequency frame DFL_FR1 may be different from the target luminance TL. The average luminance of the first low frequency frame DFL_FR1 may be visually recognized as the luminance of the display panel 100 to the user.

Since the hysteresis characteristic of the driving transistor T1 is recovered in a second low frequency frame DFL_FR2 having the low frequency DFL, an optical waveform of a second low frequency frame DFL_FR2 may be an optical waveform G2 in which the flicker of the low frequency DFL is not visually recognized. A peak luminance of the second low frequency frame DFL_FR2 may be the peak luminance DF1_PL of the optical waveform G2 in which the flicker of the low frequency DFL is not visually recognized. When the area of the optical waveform of the second low frequency frame DFL_FR2 is divided by the frame cycle of the low frequency DFL, an average luminance of the second low frequency frame DFL_FR2 may be calculated, as shown in FIG. 6. Since the optical waveform of the second low frequency frame DFL_FR2 is the optical waveform G2 in which the flicker of the low frequency DFL is not visually recognized, the average luminance of the second low frequency frame DFL_FR2 may be the target luminance TL. The average luminance of the second low frequency frame DFL_FR2 may be visually recognized as the luminance of the display panel 100 to the user.

Accordingly, when the driving frequency of the display panel 100 is changed from the high frequency DFH to the low frequency DFL, the hysteresis characteristic of the driving transistor T1 in the first low frequency frame DFL_FR1 may be changed, and the peak luminance of the first low frequency frame DFL_FR1 may be greater than the peak luminance DF2_PL of the optical waveform G2 in which the flicker of the low frequency DFL is not visually recognized. In addition, an area difference between the area of the optical waveform of the first low frequency frame DFL_FR1 and the area of the optical waveform G2 in which the flicker of the low frequency DFL is not visually recognized may be visually recognized as the flicker to the user. When an area difference LUM_AREA_DIFF between the area of the optical waveform G2 in which the flicker of the low frequency DFL is not visually recognized and the area of the optical waveform G2' in which the flicker of the low frequency DFL is visually recognized is divided by the frame cycle of the low frequency DFL, a luminance difference LUM_DIFF of the first low frequency frame DFL_FR1 may be calculated.

A difference between the peak luminance DF2_PL' of the optical waveform G2' in which the flicker of the low frequency DFL is visually recognized and the peak luminance DF2_PL of the optical waveform G2 in which the flicker of the low frequency DFL is not visually recognized may be also referred to as a peak luminance difference PL_DIFF.

Figure 7:
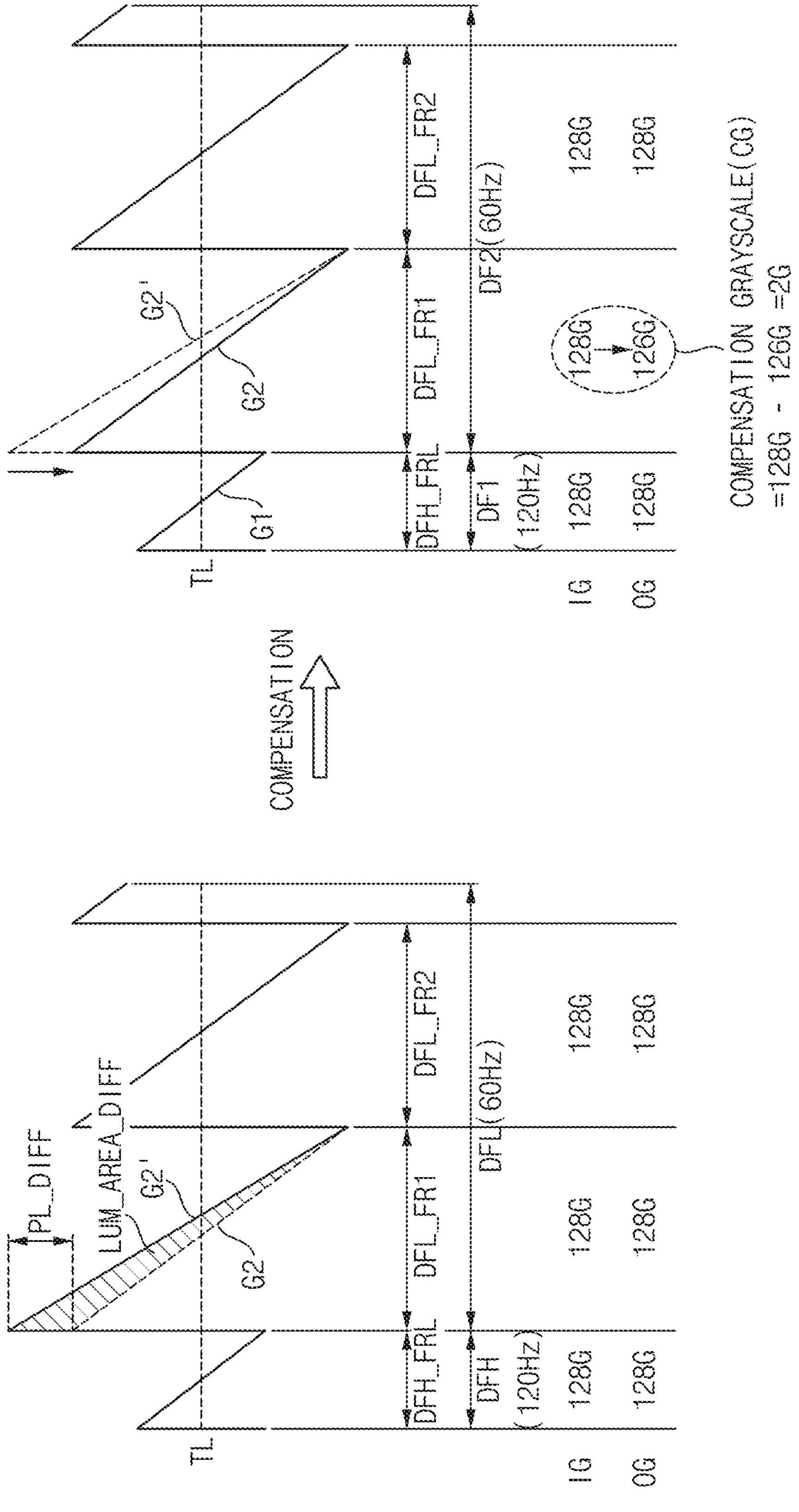
FIG. 7 is a diagram illustrating the luminance of the display panel of FIG. 5 when a grayscale compensation operation is performed.

FIG. 7 is a diagram illustrating the luminance of the display panel 100 of FIG. 5 when a grayscale compensation operation is performed.

Referring to FIGS. 5 to 7, when the driving frequency of the display panel 100 is changed from the high frequency DFH to the low frequency DFL, the output grayscale OG of the first low frequency frame DFL_FR1 having the low frequency DFL may be less than or equal to the input grayscale IG. In addition, the output grayscale OG of the first low frequency frame DFL_FR1 may be less than or equal to an output grayscale OG of the high frequency frame having the high frequency DFH. When the output grayscale OG of the first low frequency frame DFL_FR1 is less than the input grayscale IG, a grayscale compensation operation may be performed by the driving controller 200. In contrast, when the output grayscale OG of the first low frequency frame DFL_FR1 is the same as the input grayscale IG, the grayscale compensation operation may not be performed by the driving controller 200.

Since the peak luminance of the first low frequency frame DFL_FR1 is greater than the peak luminance DF2_PL of the optical waveform G2 in which the flicker of the low frequency DFL is not visually recognized, the driving controller 200 may compensate for the input grayscale IG by decreasing the input grayscale IG. Thus, the output grayscale OG of the first low frequency frame DFL_FR1 may be less than the input grayscale IG. In an embodiment, the input grayscale IG may be 128 grayscales, and the output grayscale OG of the first low frequency frame DFL_FR1 may be 126 grayscales, for example. Thus, a difference between the input grayscale IG and the output grayscale OG may be also referred to as a compensation grayscale CG, and the compensation grayscale CG of the first low frequency frame DFL_FR1 may be 2 grayscales.

The compensation grayscale CG of the first low frequency frame DFL_FR1 may correspond to the luminance difference LUM_DIFF (refer to FIG. 6) of the first low frequency frame DFL_FR1. Accordingly, the peak luminance of the first low frequency frame DFL_FR1 may be compensated by the peak luminance DF2_PL of the optical waveform G2 in which the flicker of the low frequency DFL is not visually recognized. Thus, the flicker may not be visually recognized by the user in the first frame DFL_FR1 of the low frequency DFL.

Figure 8:
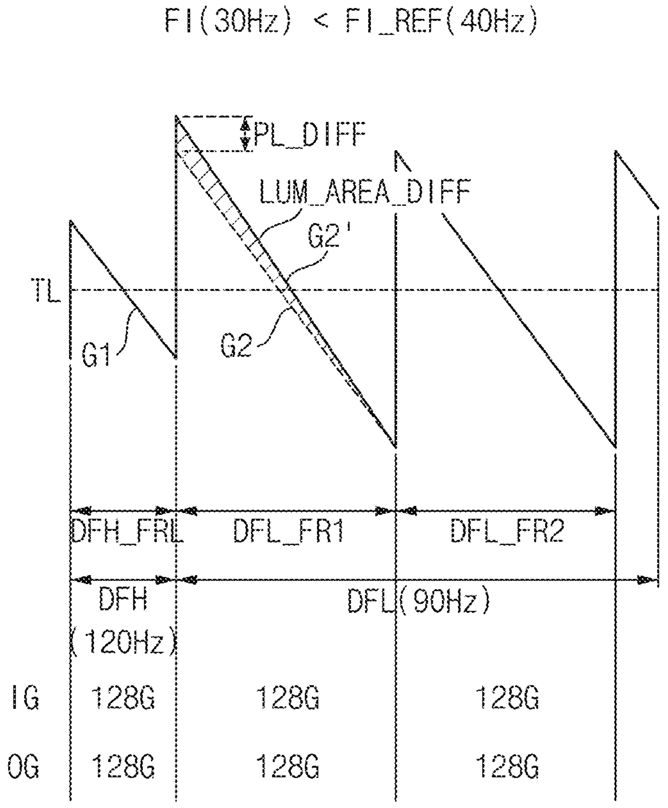
FIG. 8 is a diagram illustrating an embodiment of the luminance of the display panel when the frequency interval is less than a reference frequency interval.

FIG. 8 is a diagram illustrating an embodiment of the luminance of the display panel 100 when the frequency interval FI is less than a reference frequency interval FI_REF.

Referring to FIG. 8, when the frequency interval FI is less than the reference frequency interval FI_REF, the output grayscale OG of the first low frequency frame DFL_FR1 may be the same as the input grayscale IG. In other words, the grayscale compensation operation may not be performed by the driving controller 200. When the input grayscale IG is changed, the reference frequency interval FI_REF may be changed. Specifically, when the input grayscale IG is decreased, the reference frequency interval FI_REF may be decreased. This will be described later in FIG. 11.

In an embodiment, the high frequency DFH may be 120 Hz and the low frequency DFL may be 90 Hz, in which the frequency interval FI may be 30 Hz, for example. In an embodiment, the input grayscale IG may be 128 grayscales, in which the reference frequency interval FI_REF may be 40 Hz, for example. In other words, the frequency interval FI may be less than the reference frequency interval FI_REF.

When the frequency interval FI is decreased, the difference between the frame cycle of the high frequency DFH and the frame cycle of the low frequency DFL may be decreased, and the peak luminance difference PL_DIFF may be decreased. Since the peak luminance difference PL_DIFF is decreased, the area difference LUM_AREA_DIFF between the area of the optical waveform G2 in which the flicker of the low frequency DFL is not visually recognized and the area of the optical waveform G2' in which the flicker of the low frequency DFL is visually recognized may be decreased, and the luminance difference LUM_DIFF (refer to FIG. 6) of the first low frequency frame DFL_FR1 may be decreased. The luminance difference LUM_DIFF of the first low frequency frame DFL_FR1 may be substantially small to be recognized by the user as the flicker, and the input grayscale value IG may not be compensated.

Figure 9:
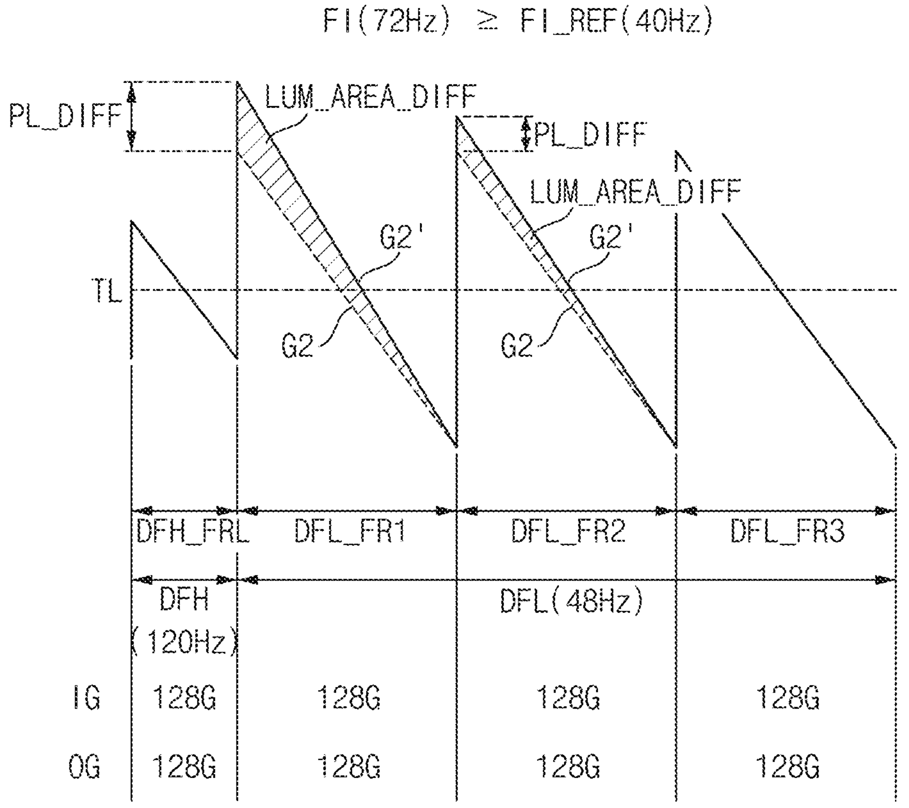
FIG. 9 is a diagram illustrating an embodiment of the luminance of the display panel when the frequency interval is greater than or equal to the reference frequency interval.
Figure 10:
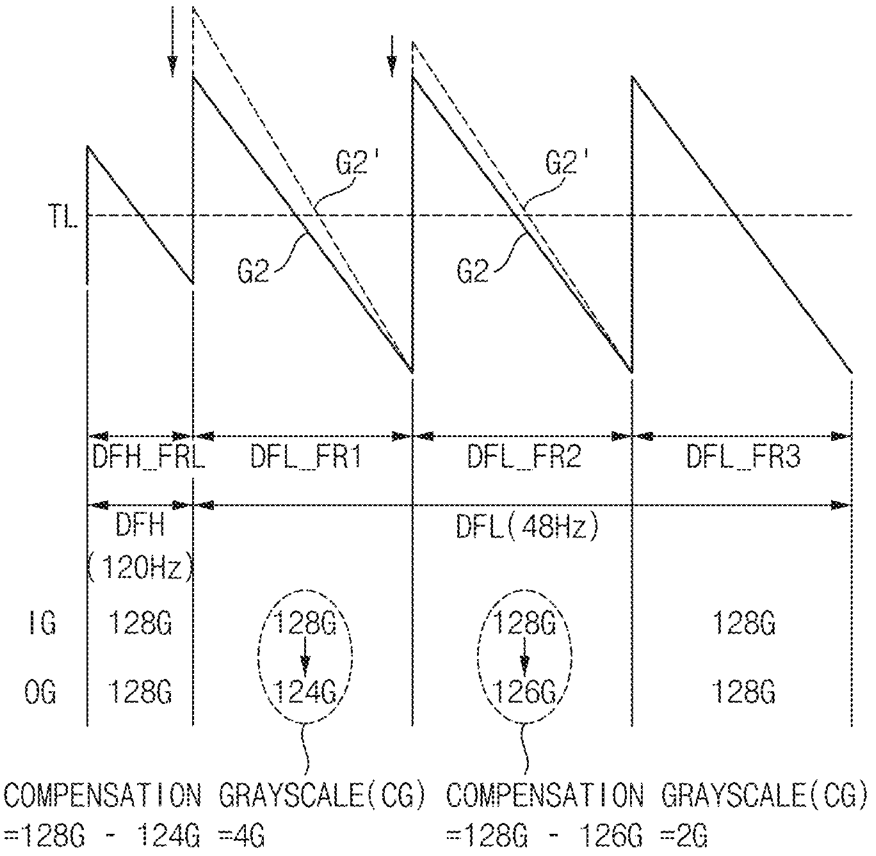
FIG. 10 is a diagram illustrating the luminance of the display panel of FIG. 9 when a grayscale compensation operation is performed.

FIG. 9 is a diagram illustrating an embodiment of the luminance of the display panel 100 when the frequency interval FI is greater than or equal to the reference frequency interval FI_REF. FIG. 10 is a diagram illustrating the luminance of the display panel 100 of FIG. 9 when a grayscale compensation operation is performed.

Referring to FIGS. 9 and 10, when the frequency interval FI is greater than or equal to the reference frequency interval FI_REF, the output grayscale OG of the first low frequency frame DFL_FR1 may be less than the input grayscale IG. In other words, the grayscale compensation operation may be performed by the driving controller 200.

In an embodiment, the high frequency DFH may be 120 Hz and the low frequency DFL may be 48 Hz, in which the frequency interval FI may be 72 Hz, for example. In an embodiment, the input grayscale IG may be 128 grayscales, in which the reference frequency interval FI_REF may be 40 Hz, for example. In other words, the frequency interval FI may be greater than the reference frequency interval FI_REF.

When the frequency interval FI is greater, the average luminance of the first low frequency frame DFL_FR1 may be greater. When the difference between the average luminance and the target luminance TL of the first low frequency frame DFL_FR1 is greater, the compensation grayscale CG of the first low frequency frame DFL_FR1 may be greater. In an embodiment, the input grayscale IG may be 128 grayscales, and the output grayscale OG of the first low frequency frame DFL_FR1 may be 124 grayscales, for example. In other words, the compensation grayscale CG of the first low frequency frame DFL_FR1 may be 4 grayscales.

The output grayscale OG of the second low frequency frame DFL_FR2 may be greater than or equal to the output grayscale OG of the first low frequency frame DFL_FR1 and less than or equal to the input grayscale IG. When the output grayscale OG of the second low frequency frame DFL_FR2 is less than the input grayscale IG, the grayscale compensation operation may be performed by the driving controller 200. In contrast, when the output grayscale OG of the second low frequency frame DFL_FR2 is the same as the input grayscale IG, the grayscale compensation operation may not be performed by the driving controller 200. In particular, when the grayscale compensation operation is performed in the first low frequency frame DFL_FR1 and the second low frequency frame DFL_FR2, the output grayscale OG may be gradually increased toward the input grayscale IG in the first low frequency frame DFL_FR1 and the second low frequency frame DFL_FR2.

When the frequency interval FI is greater, the average luminance of the second low frequency frame DFL_FR2 may be greater. When the difference between the average luminance and the target luminance TL of the second low frequency frame DFL_FR2 is greater, the compensation grayscale CG of the second low frequency frame DFL_FR2 may be greater. In an embodiment, the input grayscale IG may be 128 grayscales, and the output grayscale OG of the second low frequency frame DFL_FR2 may be 126 grayscales, for example. In other words, the compensation grayscale CG of the second low frequency frame DFL_FR2 may be 2 grayscales.

Figure 11:
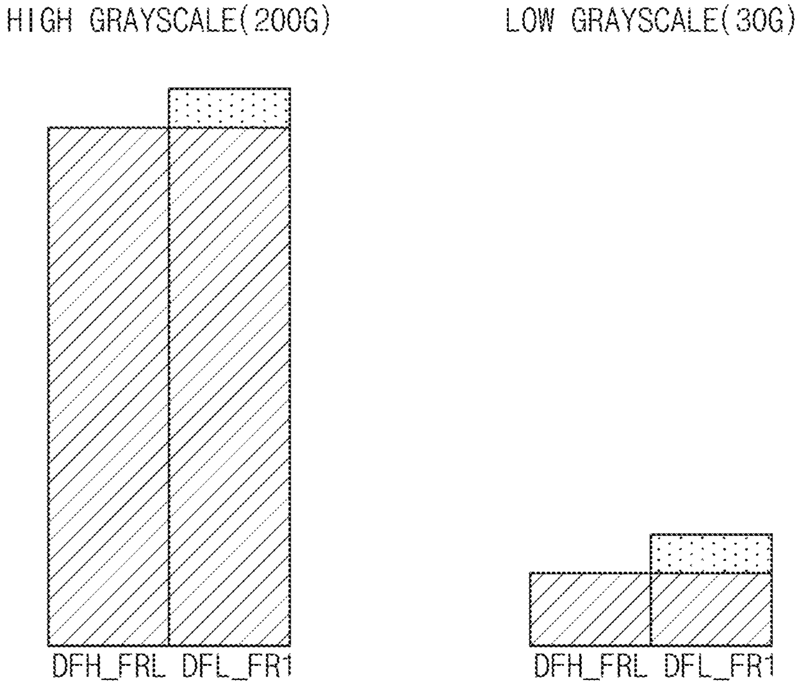
FIG. 11 is a diagram illustrating reference frequency intervals according to a relatively high grayscale and a relatively low grayscale.

FIG. 11 is a diagram illustrating reference frequency intervals according to a relatively high grayscale and a relatively low grayscale.

Referring to FIG. 11, when the input grayscale IG is changed, the reference frequency interval FI_REF may be changed. Specifically, when the input grayscale IG is decreased, the reference frequency interval FI_REF may be decreased.

The luminance difference LUM_DIFF (refer to FIG. 6) of the first low frequency frame DFL_FR1 is increased as the frequency interval FI is increased, the flicker is more likely to be visually recognized by the user in the first low frequency frame DFL_FR1. As shown in FIG. 11, when the luminance difference LUM_DIFF of the first low frequency frame DFL_FR1 is the same, the ratio of the luminance difference LUM_DIFF of the first low frequency frame DFL_FR1 to the luminance of the display panel 100 may be greater at the relatively low gray scale than at the relatively high gray scale. Thus, even when a relatively small amount of luminance difference occurs, there is a relatively high possibility that the flicker is visually recognized by the user at the relatively low gray scale. Accordingly, the reference frequency interval FI_REF is desired to be relatively small at the relatively low gray scale.

Figure 12:
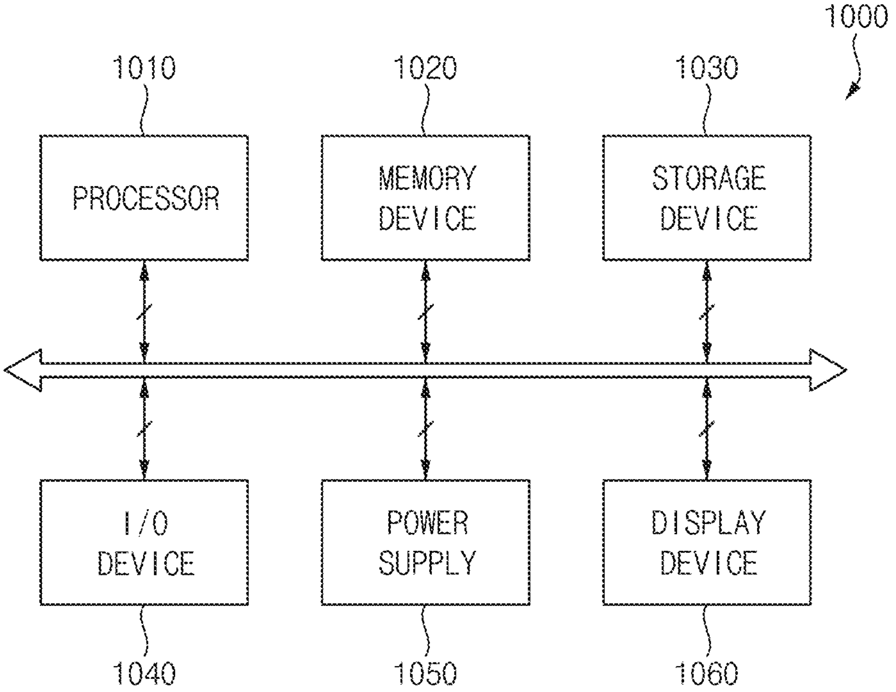
FIG. 12 is a block diagram illustrating an electronic device.
Figure 13:
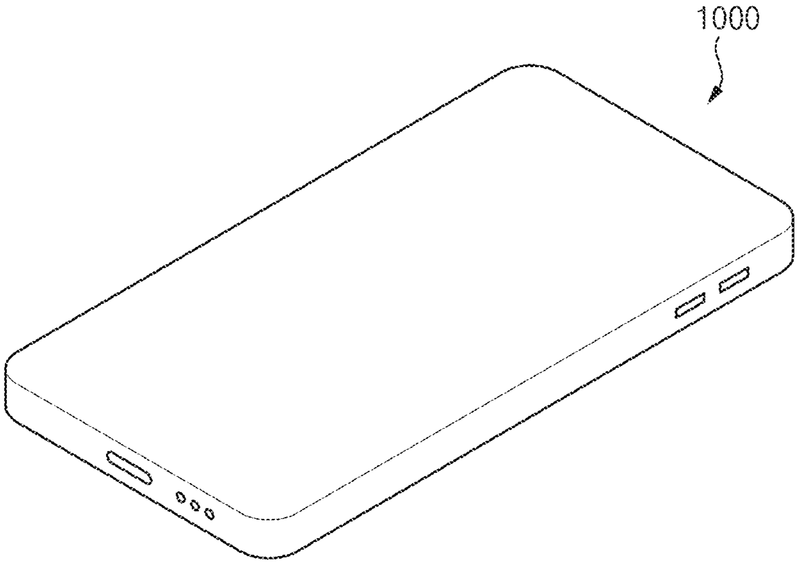
FIG. 13 is a diagram illustrating an embodiment in which the electronic device of FIG. 12 is implemented as a smart phone device.

FIG. 12 is a block diagram illustrating an electronic device 1000. FIG. 13 is a diagram illustrating an embodiment in which the electronic device 1000 of FIG. 12 is implemented as a smart phone device.

Referring to FIGS. 12 and 13, the electronic device 1000 may include a processor 1010, a memory device 1020, a storage device 1030, an input/output ("I/O") device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus ("USB") device, other electronic device, or the like.

In an embodiment, as illustrated in FIG. 13, the electronic device 1000 may be implemented as a smart phone. However, the electronic device 1000 is not limited thereto. In an embodiment, the electronic device 1000 may be implemented as a cellular phone, a video phone, a smart pad, a smart watch, a tablet personal computer ("PC"), a car navigation system, a computer monitor, a laptop, a head mounted display ("HMD") device, or the like, for example.

The processor 1010 may perform various computing functions. The processor 1010 may be a micro processor, a central processing unit ("CPU"), an application processor ("AP"), or the like. The processor 1010 may be coupled to other components via an address bus, a control bus, a data bus, or the like. Further, the processor 1010 may be coupled to an extended bus such as a peripheral component interconnection ("PCI") bus.

The memory device 1020 may store data for operations of the electronic device 1000. In an embodiment, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, or the like and/or at least one volatile memory device such as a dynamic random access memory ("DRAM") device, a static random access memory ("SRAM") device, a mobile DRAM device, or the like, for example.

The storage device 1030 may include a solid state drive ("SSD") device, a hard disk drive ("HDD") device, a compact disc read-only memory ("CD-ROM") device, or the like.

The I/O device 1040 may include an input device such as a keyboard, a keypad, a mouse device, a touch-pad, a touch-screen, or the like, and an output device such as a printer, a speaker, or the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. In an embodiment, the inventive concepts may be applied to a mobile phone, a smart phone, a tablet computer, a digital television ("TV"), a three dimensional ("3D") TV, a PC, a home appliance, a laptop computer, a personal digital assistant ("PDA"), a portable multimedia player ("PMP"), a digital camera, a music player, a portable game console, a navigation device, etc., for example.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the illustrative embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A display device comprising:

a display panel including pixels;

a driving controller which receives input image data including an input grayscale from a host and generates a data signal including an output grayscale based on the input image data; and a data driver which converts the data signal into a data voltage and provides the data voltage to the display panel, wherein, in a case which a driving frequency of the display panel is changed from a first frequency to a second frequency, an output grayscale of a first low frequency frame having the second frequency is less than or equal to the input grayscale, wherein, in a case which a frequency interval, which is a difference between the first frequency and the second frequency, is greater than or equal to a reference frequency interval, the output grayscale of the first low frequency frame is less than the input grayscale, and wherein the reference frequency interval is changed in a case which the input grayscale value is changed.

2. The display device of claim 1, wherein an average luminance of the first low frequency frame is greater in a case which a frequency interval, which is a difference between the first frequency and the second frequency, is greater.

3. The display device of claim 2, wherein a compensation grayscale of the first low frequency frame, which is a difference between the input grayscale and the output grayscale of the first low frequency frame, is greater in a case which a difference between the average luminance of the first low frequency frame and a target luminance corresponding to the input grayscale is greater.

4. The display device of claim 1, wherein an output grayscale of a second low frequency frame having the second frequency is greater than or equal to the output grayscale of the first low frequency frame and is less than or equal to the input grayscale.

5. The display device of claim 4, wherein the output grayscale is gradually increased toward the input grayscale in the first low frequency frame and the second low frequency frame.

6. The display device of claim 1, wherein the output grayscale of the first low frequency frame is less than or equal to an output grayscale of a high frequency frame having the first frequency.

7. The display device of claim 1, wherein, in a case which the frequency interval is less than the reference frequency interval, the output grayscale of the first low frequency frame is equal to the input grayscale.

8. The display device of claim 1, wherein the reference frequency interval is decreased in a case which the input grayscale is decreased.

9. A method for driving a display device, the method comprising:

receiving input image data including an input grayscale from a host and generating a data signal including an output grayscale based on the input image data; and converting the data signal into a data voltage and providing the data voltage to a display panel, wherein, in a case which a driving frequency of the display panel is changed from a first frequency to a second frequency, an output grayscale of a first low frequency frame having the second frequency is less than or equal to the input grayscale, wherein the output grayscale of the first low frequency frame is less than the input grayscale in a case which a frequency interval, which is a difference between the first frequency and the second frequency, is greater than or equal to a reference frequency interval, and wherein the reference frequency interval is changed in a case which the input grayscale is changed.

10. The method of claim 9, wherein an average luminance of the first low frequency frame is greater in a case which a frequency interval, which is a difference between the first frequency and the second frequency, is greater.

11. The method of claim 10, wherein a compensation grayscale of the first low frequency frame, which is a difference between the input grayscale and the output grayscale of the first low frequency frame, is greater in a case which a difference between the average luminance of the first low frequency frame and a target luminance corresponding to the input grayscale is greater.

12. The method of claim 9, wherein an output grayscale of a second low frequency frame having the second frequency is greater than or equal to the output grayscale of the first low frequency frame and is less than or equal to the input grayscale.

13. The method of claim 12, wherein the output grayscale is gradually increased toward the input grayscale in the first low frequency frame and the second low frequency frame.

14. The method of claim 9, wherein the output grayscale of the first low frequency frame is less than or equal to an output grayscale of a high frequency frame having the first frequency.

15. The method of claim 1, wherein the output grayscale of the first low frequency frame is equal to the input grayscale in a case which the frequency interval is less than the reference frequency interval.

16. The method of claim 1, wherein the reference frequency interval is decreased in a case which the input grayscale is decreased.

* * * * *